Patented Jan. 15, 1929.

1,698,973

UNITED STATES PATENT OFFICE.

ANDREW T. K. TSENG, OF DETROIT, MICHIGAN, ASSIGNOR TO HYDRAULIC BRAKE COMPANY, OF LOS ANGELES, CALIFORNIA, A CORPORATION OF CALIFORNIA.

FLUID COMPOSITION.

No Drawing.    Application filed May 31, 1927.   Serial No. 195,602.

This invention pertains to fluid compositions and more particularly to fluid compositions for use in fluid pressure systems such as hydraulic brakes, check valves, etc. Certain special characteristics are required of fluids for this use which are very difficult to obtain.

The fluid must be stable, that is, the component parts must not react with each other under the various conditions of temperature and pressure to which it is subjected. It must not react with the materials of which the container or exposed parts are composed, that is, it must not attack rubber, rubber compositions, or metals, especially copper. It must have a relatively small coefficient of expansion. It must have a relatively uniform viscosity through a wide range of temperatures; and it must be stable in both chemical and physical characteristics throughout a wide temperature range.

The object of this invention is to provide a fluid which combines these requisites.

Other objects will be apparent as the detailed description of my invention proceeds.

To obtain a solution of suitable viscosity a mixture of castor oil and alcohol has heretofore been used for actuating the pistons in the so-called hydraulic braking systems. The alcohol overcomes to a certain extent the detrimental effect of the castor oil upon the rubber used for cup washers and for piping. I have found that the use of certain esters, preferably dibutylphthalate, not only serves to protect the rubber to a greater extent, but also yields a solution which is more stable, has a considerably less coefficient of expansion and displays a more uniform and higher viscosity throughout a wider temperature range than the solutions heretofore used.

A preferred embodiment of my invention may be described as follows: Three gallons of dibutylphthalate

are thoroughly mixed with seven gallons of castor oil. The castor oil should preferably be of a viscosity of 0.959 to 0.963 at 60° F., should have a saponification number of 176 to 180, an iodine number of 87 to 93, a free fatty acid value of not over one percent, and a refractive index of 1.4795 to 1.4803 at 60° F.

The dibutylphthalate is preferably a specific gravity 1.043 to 1.050 at 60° F. and should be of 98 to 100% purity with an acidity (as phthalic acid) of preferably not more than .05%. This reagent is water white, has a mild odor and will not distill under atmospheric pressure without decomposition. This reagent is preferably free from water.

The percent of free fatty acid (calculated as oleic acid) is then determined by any conventional method, and for each percent of free acid 112 grams of potassium hydroxide dissolved in one-half pint of butyl alcohol is prepared. The amount of alcohol should be as small as possible and the solution of the potassium hydroxide may be hastened by carefully heating the reagents.

To the solution of potassium hydroxide in the butyl alcohol 10 grams of a coloring agent, preferably fluorescein dye, is added together with about 60 grams of tri-potassium arsenate ($K_3AsO_4$). The potassium arsenate should be chemically pure and the acid salt $KH_2AsO_4$ should not be used due to its insolubility in the alcohol and its acidity.

When the castor oil and the dibutylphthalate are thoroughly mixed the alcoholic mixture is slowly added, with agitation, to the mixture. The alcoholic solution should not be added more than 100 cc. per minute and the mixture should be thoroughly stirred throughout the process.

The addition of the postassium hydroxide serves the double function of neutralizing the free acid in the solution and preventing the formation of insoluble metallic soaps such as those of aluminum, iron, copper, etc.

The potassium arsenate is a well known anti-corrosive agent. Under the heat and other conditions to which the fluid is subject while in contact with the rubber, suspensoids or colloids tend to be formed which carry a considerable quantity of sulphur. The arsenic is believed to prevent this action, to cause the precipitation of deleterious colloids, and to thereby prevent the metal from being corroded by the sulphur.

While I have described a modification using a butyl ester of phthalic acid, it is understood that I do not limit myself to this compound as any suitable ester such as methyl salicylate, ethyl benzoate, etc. may be used. However, most aliphatic esters such as amylacetate and butyl acetate hydrolyze easily and the acids tend to cause corrosion. Butyl phthalate is by far the best ester known at this time for the purpose specified, both from the standpoint of physical and chemical properties and from the standpoint of cost.

Also other oils may be used instead of castor oil although I have found the properties of the latter to be especially adapted for my purpose. Any oil can be used which has a low solidifying point, is relatively free from fatty acid which will stand the excessive heat and which will not affect the rubber.

The fluid prepared as above described has a higher viscosity than fluids formerly available and its viscosity is more uniform throughout a wide range of temperatures.

This fluid does not give an aldehyde formation or form any reaction products which might attack rubber or metals.

The fluid has considerably less expansion than the fluid heretofore used, gives no cloudiness, does not precipitate under low temperatures and has in itself a lubricating value which renders it especially suitable for operating hydraulic brakes and fluid operated mechanisms of this kind.

I claim:

1. A fluid for use in fluid pressure apparatus comprising a difficultly hydrolyzable ester and an oil characterized by a low solidifying point, stability at high temperature and inertness toward rubber.

2. A fluid for use in fluid pressure apparatus comprising castor oil and a difficultly hydrolyzable ester.

3. A fluid composition for use in fluid pressure apparatus comprising castor oil and an ester of an aromatic acid.

4. A fluid composition for use in fluid pressure apparatus comprising castor oil and an ester of phthalic acid.

5. A fluid for use in fluid pressure apparatus comprising a mixture of castor oil and dibutylphthalate.

6. A fluid for use in fluid pressure apparatus comprising castor oil and dibutylphthalate neutralized by an alkali metal hydroxide.

7. A fluid comprising castor oil, dibutylphthalate, an alkali metal hyroxide and an alkali metal arsenic salt.

8. A fluid for operating fluid pressure apparatus comprising castor oil and dibutylphthalate to which has been added a small amount of postassium hydroxide and potassium arsenate.

9. A fluid comprising about three parts dibutylphthalate to seven parts of castor oil by volume to which has been added a small amount of potassium arsenate, potassium hydroxide, and a coloring agent dissolved in butyl alcohol.

10. The method of preparing a fluid for use in hydraulic apparatus which comprises slowly adding with constant stirring an alcoholic solution of potassium hydroxide and potassium arsenate to a mixture of castor oil and dibutylphthalate.

In witness whereof, I hereunto subscribe my name this 25th day of May, 1927.

ANDREW T. K. TSENG.